United States Patent [19]

Bradshaw et al.

[11] Patent Number: 4,592,031
[45] Date of Patent: May 27, 1986

[54] PRECORRELATION FILTERING

[75] Inventors: David C. Bradshaw, Houston; William C. Robinson, Alpine; James R. Rossi, Humble, all of Tex.

[73] Assignee: Standard Oil Company (Indiana), Chicago, Ill.

[21] Appl. No.: 542,924

[22] Filed: Oct. 18, 1983

Related U.S. Application Data

[63] Continuation of Ser. No. 254,791, Apr. 15, 1981, abandoned, which is a continuation of Ser. No. 45,535, Jun. 4, 1979, abandoned.

[51] Int. Cl.⁴ ............................................. G01V 1/28
[52] U.S. Cl. .................................... 367/45; 367/49; 343/17.5
[58] Field of Search ............... 367/43, 45, 49, 189; 181/108; 343/17.5

[56] References Cited

U.S. PATENT DOCUMENTS

| | | | |
|---|---|---|---|
| 2,521,130 | 9/1950 | Scherbatskoy | 367/49 |
| 2,688,124 | 8/1954 | Doty et al. | 367/45 |
| 2,982,371 | 5/1961 | Woods et al. | 367/45 |
| 3,015,086 | 12/1961 | Heintz | 367/49 |
| 3,198,281 | 8/1965 | Mifsud | 367/49 |
| 3,281,776 | 10/1966 | Ruehle | 367/45 |
| 3,363,230 | 1/1968 | Bemrose | 367/49 |
| 3,466,652 | 9/1969 | Heyser | 343/17.5 |
| 3,568,142 | 3/1971 | Landrum et al. | 367/43 |
| 3,701,091 | 10/1972 | Lenihan | 367/45 |
| 4,363,112 | 12/1982 | Widrow | 367/49 |

OTHER PUBLICATIONS

Waters, "Reflection Seismology", 1981, pp. 87–116.

*Primary Examiner*—Nelson Moskowitz
*Assistant Examiner*—Ian J. Lobo
*Attorney, Agent, or Firm*—Timothy D. Stanley

[57] ABSTRACT

A time variant filter system is employed for removing spurious noise content from a received seismic data signal. The filter passband tracks delayed versions of the pilot signal of a vibrator seismic source. The resulting recorded portion of the received seismic signal is thus restricted to a desired time-frequency band (which is expected to contain the significant mapping information) prior to being recorded. The band is made adjustable in order to allow for optimization with respect to the particular geologic region being prospected.

12 Claims, 11 Drawing Figures

PRECORRELATION FILTERING

This is a continuation of application Ser. No. 254,791, filed Apr. 15, 1981, now abandoned, which is a continuation of application Ser. No. 045,535, filed June 4, 1979, now abandoned.

FIELD OF THE INVENTION

This invention relates to seismic mapping of underground geological structure and more particularly to a method and apparatus for removing spurious signals and noise from vibrator initiated seismic signals.

BACKGROUND OF THE INVENTION

In traditional seismic prospecting an explosive seismic wave energy source is positioned in a relatively shallow shot hole at the surface of the earth and an acoustic energy impulse of some preselected wave shape and frequency content is generated thereby. The acoustic energy generated by the source propagates through the multiple layers of material comprising the subterranean portion of the earth in the region being prospected. Since the speed of sound is generally different in the various geological layers beneath the surface of the earth, refractions, reflections, and diffractions of the acoustic energy waves occur at the boundaries of each layer. At the surface of the earth the returning acoustic energy waves are sensed by a plurality of seismic detectors. These detectors produce electrical signals which characterize the magnitude and frequency content of the acoustic energy waves detected. These electrical signals are typically recorded on magnetic tape and are used later in conjunction with a large number of similar recordings to generate a seismic "section", i.e. a display of a cross-section of subterranean geological structure. These seismic "sections" can be very useful in the search for underground mineral and petroleum deposits.

The above-described traditional technique for seismic prospecting has certain serious drawbacks. One problem is the expense associated with the preparation of a large number of widely spaced shot holes. Another problem is the significant surface and air noise connected with such explosions. Furthermore, there is an element of danger connected therewith.

U.S. Pat. No. 2,688,124 issued to Doty, et al, on Aug. 31, 1954, disclosed a very useful alternative approach for seismic prospecting. The Doty approach employs a vibrating seismic energy source instead of the traditional explosive source. These vibrating seismic signals are varied in frequency in a unique non-repetitive manner over a period of time. The received seismic signals are then correlated with a counterpart of the transmitted signal in a manner which results in the production of an accurate measurement of the seismic signal travel time between the vibrator source and the seismic signal detector. The Doty technique was a very significant contribution to the seismic art, and is currently in widespread use. The method is commonly referred to as the VIBROSEIS technique (VIBROSEIS is a service mark of the Continental Oil Company).

The Applicants have observed a serious practical difficulty connected with the implementation of the above-described technique. In particular, the dynamic range of the recording medium is often substantially expended in the recording of the direct waves and ground roll signals which are also generated by the vibrator source. Thus, the desired reflected seismic signals tend to be restricted to only a small portion of the dynamic range of the recording medium, since they are much smaller in magnitude than the direct waves and ground roll. The result can be a drowning out or masking of the desired signals by these extraneous signals which do not contribute to the mapping of subsurface structure. Since all recording media have a finite dynamic range, it would be very desirable to eliminate the ground roll and direct wave signals from the output signals of the seismic detectors prior to the recording thereof—thus allowing substantially the entire dynamic range to be used for recording of significant data.

SUMMARY OF THE INVENTION

The Applicants have observed that there tends to be a time separation between the received direct waves, the reflected seismic information, and the received ground roll. The ground roll comprises the slowest travelling energy, whereas the direct waves tend to travel at the highest speed. Generally, the desired reflected seismic signals travel at an intermediate speed. The Applicants have determined that the ground roll, direct waves, and other spurious noise can be substantially reduced by filtering the signals received at the detector with a time-variable bandpass filter which is keyed to the pilot signal of the vibrator source. Typically, this pilot signal is a constant magnitude sinusoidal signal which starts at a fixed lower frequency and increases in frequency during the time period of the seismic run. A typical pilot signal, for example, would cover the range from 10 to 200 Hertz during a run time of 20 seconds. The frequency increase is typically a linear function of time, but it need not necessarily be so.

The purpose for using the time-variable bandpass filter is to restrict the recorded signal to a time-frequency spectrum in which the significant reflected seismic signals are expected to occur. For a pilot signal with a frequency output that varies linearly with time, this spectrum is defined in the time-frequency plane by a parallelogram with its upper and lower sides corresponding respectively to the highest and lowest frequency of the pilot signal, and with the other two sides thereof being suitably delayed counterparts of the pilot signal. Ideally, all signals existing outside of this acceptance parallelogram will be eliminated prior to the recording process. If the pilot signal is a non-linear function of time the acceptance region or pass spectrum will have two curved sides, each being simply delayed counterparts of the particular pilot signal. By employment of the technique and apparatus of the instant invention a skilled seismologist can accomplish the production of seismic sections (i.e. subterranean maps) of vastly improved definition, accuracy, and interpretability.

DETAILED DESCRIPTION OF THE PREFERRED EMBODIMENT

Figure 1:
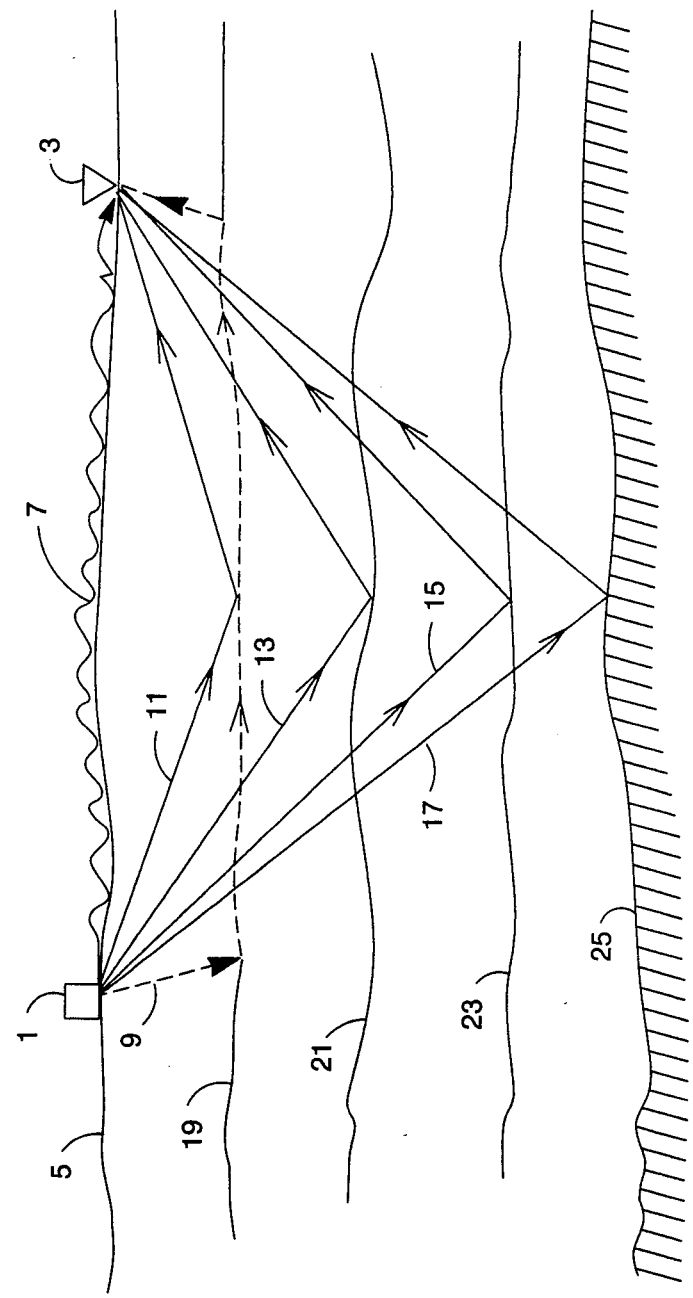
FIG. 1 shows typical paths followed by the ground roll, direct waves, and the reflected seismic signals.

Referring now to FIG. 1, therein depicted is a seismic data acquisition system being used to map subterranean structure. The seismic signal initiator 1, which for the instant invention is a vibrator source, is used to transmit acoustic energy from the surface 5 of the earth to subterranean interfaces 19, 21, 23, and base rock 25. The ray paths 11, 13, 15 and 17 depict the paths of the desired reflected mapping signals which are received at the location of the seismic detector 3 at the surface level. Also shown is the path of the fast moving direct wave 9 propagating along the first significant interface 19 from the transmitter 1 to the detector 3. The slow moving ground roll, depicted by the wavy line 7, moves along the surface 5 directly from the transmitter 1 to the detector 3. The magnitudes of the reflected signals travelling along the ray paths 11, 13, 15 and 17 are generally substantially smaller than the magnitudes of the ground roll 7 and direct wave 9. It is an object of the instant invention to discriminate the reflected signals from the unwanted ground roll and direct wave.

Figure 2:
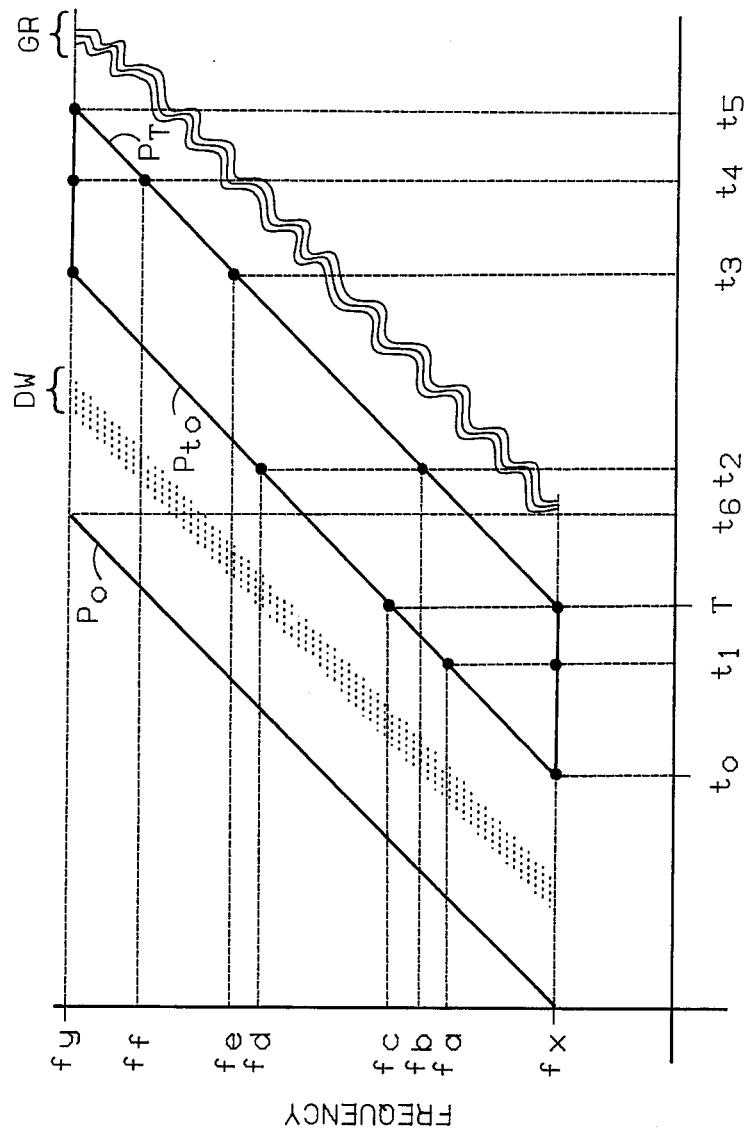
FIG. 2 shows a typical time-frequency spectrum parallelogram of the instant invention using a linear pilot signal.
Figure 3A:
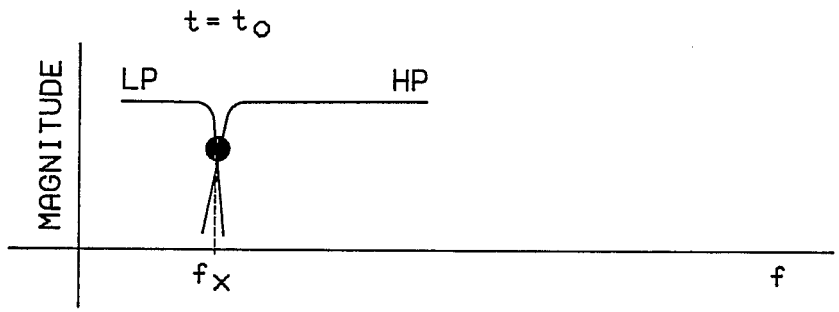
FIGS. 3(a)-3(g) show a time sequence of frequency domain plots of the time-variable low pass and high pass filter characteristics used to implement the preferred embodiment of the instant invention.
Figure 3B:
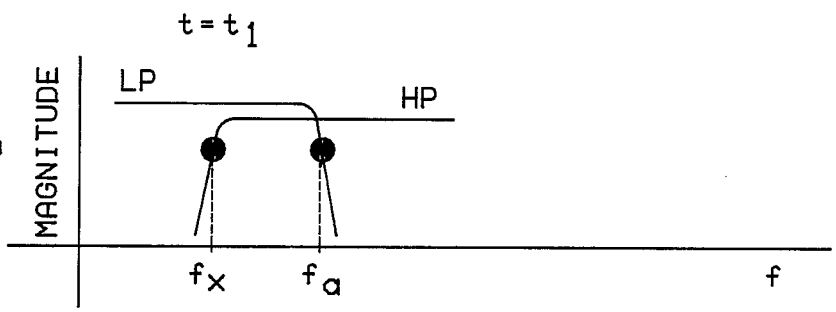
Figure 3C:
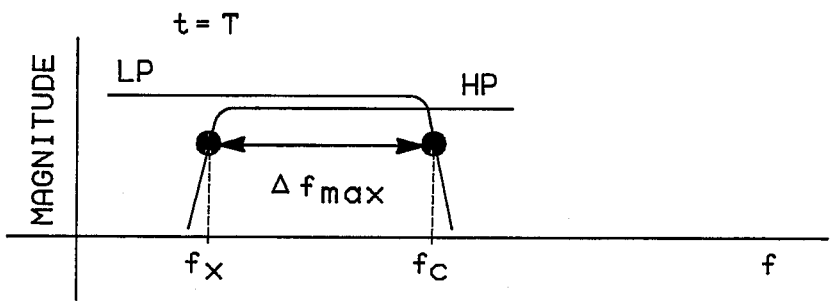
Figure 3D:
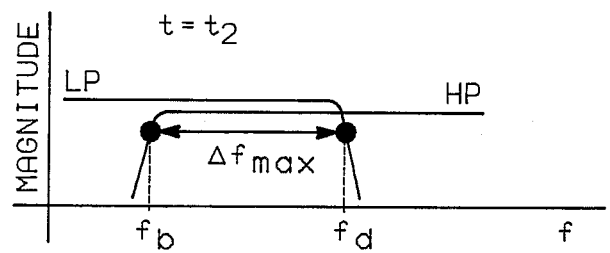
Figure 3E:
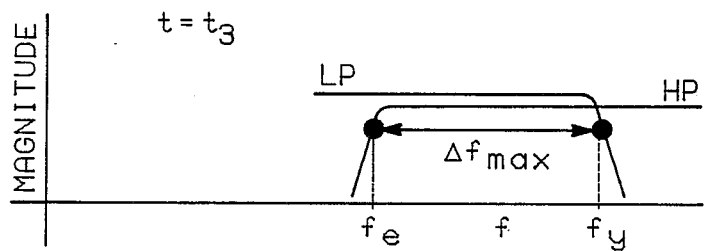
Figure 3F:
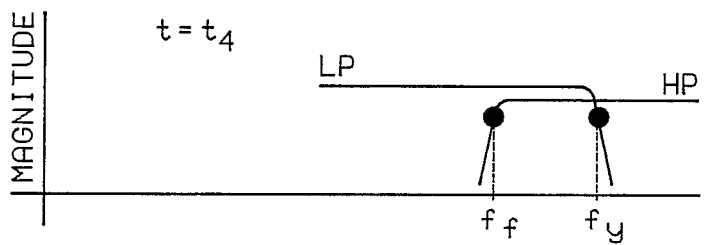
Figure 3G:
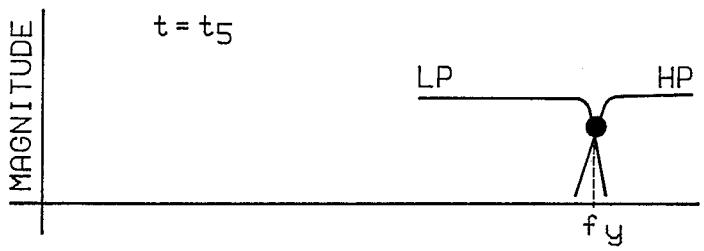

FIG. 2, which is best interpreted in light of FIG. 1, shows graphically the operation and usefullness of the instant invention. The ordinant of the graphical display of FIG. 2 is a linear frequency scale covering a range of frequencies normally used with vibrator seismic sources; the abscissa thereof is a linear time scale covering a time period normally used for seismic data collection runs with vibrator sources.

The vibrator pilot signal $P_0$ is a typical linear frequency sweep signal which has a frequency $f_x$ at time $t=0$ and increases to a maximum frequency of $f_y$ at time $t=t_6$. An amplified version of this pilot signal $P_0$ drives the vibrator source 1 which in turn generates the desired acoustic energy of the same time-frequency spectrum as necessary for seismic prospecting.

The earliest received reflected seismic signals (e.g. those travelling along ray path 11 in FIG. 1) will be from the shallowest subterranean interface and will have a frequency content corresponding to the lowest frequency of the pilot signal. The delay associated with this first received reflected signal will correspond to its travel time through the first subterranean layer (e.g. the layer bounded by the surface 5 and the interface 19 in FIG. 1). It is, therefore, unnecessary and undesirable to record any received signals prior to the expiration of the delay time for the arrival of the first reflected signal. Thus, for example, the direct wave (e.g. the wave travelling along path 9 in FIG. 1) which generally arrives at the detector prior to the arrival of the first reflected wave could be rejected or eliminated prior to its being recorded without adversely affecting the recording of the desired reflected mapping signal. Similarly, the ground roll (wave 7 in FIG. 1) can be distinguished from the reflected mapping signals since it is a slowly moving wave relative to the reflected waves. The ground roll signal having a particular frequency content will be detected after the reflected signals with the same frequency content. Thus, by using a time variant filter with a passband as depicted by the parallelogram in FIG. 2, the direct waves DW and the ground roll GR can be eliminated prior to recording of the data. Note that the left-hand side of the parallelogram is defined by line $P_{t_o}$ which is simply a delayed counterpart of the vibrator pilot signal $P_0$. The delay $t_o$ associated with the line $P_{t_o}$ corresponds to the travel time of the shallowest reflected signal (e.g. trace 11 in FIG. 1). Similarly, the delay T associated with the line $P_T$ corresponds to the travel time of the deepest reflected signal of interest (e.g. ray 17 in FIG. 1 reflected off of base rock 25). The top and bottom lines of the passband parallelogram correspond to the maximum and minimum frequencies $f_x$ and $f_y$ of the vibrator pilot signal $P_0$.

The passband depicted in the time-frequency domain plot of FIG. 2 can be simply implemented by means of a combination of time variable low-pass and high-pass filters as shown in FIG. 3. The magnitude vs. frequency plots of FIGS. 3A–G are shown with time as a parameter to correspond with the times marked on the time-frequency domain plot of FIG. 2. The filter magnitude vs. frequency plots of FIG. 3 are intended only as qualitative indications of the locations of the low pass and high pass filter cut off points (i.e., the −3 db points as indicated by the heavy solid dots) as functions of time corresponding to the time and frequency intervals indicated in FIG. 2. At time $t=t_o$ the low pass filter (LP) rejects signals with frequency content above $f_x$, and the high pass filter (HP) rejects signals with frequency content below $f_x$ (where $f_x$ is the lowest frequency of the vibrator pilot signal $P_0$). At $t=t_1$ the high pass characteristic has not changed but the low pass break point has moved out along the frequency axis to $f=f_a$. The movement of the low pass filter characteristic break point is linear with time as per the delayed pilot signal counterpart $P_{t_o}$ (as shown in FIG. 2). At $t=T$ the passband of the combined low pass and high pass filters reaches its maximum width of $(f_c-f_x)$. After $t=T$ both the low pass and high pass filter cut off points move linearly with time in a direction of increasing frequency while maintaining a constant bandwidth therebetween. Thus, the passband of the combined filters at $t=t_2$ has the same bandwidth as that defined at $t=T$, but the passband is shifted upward in frequency with the lower limit at $f=f_b$ and the upper limit at $f=f_d$. The passband continues to shift upward with frequency in a linear fashion until the low pass filter break point reaches the maximum vibrator frequency $f_y$ at $t=t_3$. At that time, the upward movement of the low pass filter stops and only the high pass filter break point continues to move. Thus, at $t=t_4$ the passband of the combined filters is reduced to a bandwidth of $(f_y-f_f)$, and finally at $t=t_5$ the upper frequency total cut off point is reached (at $f=f_y$). The equation of the vibrator pilot signal, with which the movement of the break points of the low pass and high pass filters are coordinated, is given as follows:

$$f(t) = \left[\frac{f_y - f_x}{t_6}\right] t + f_x$$

Figure 4:
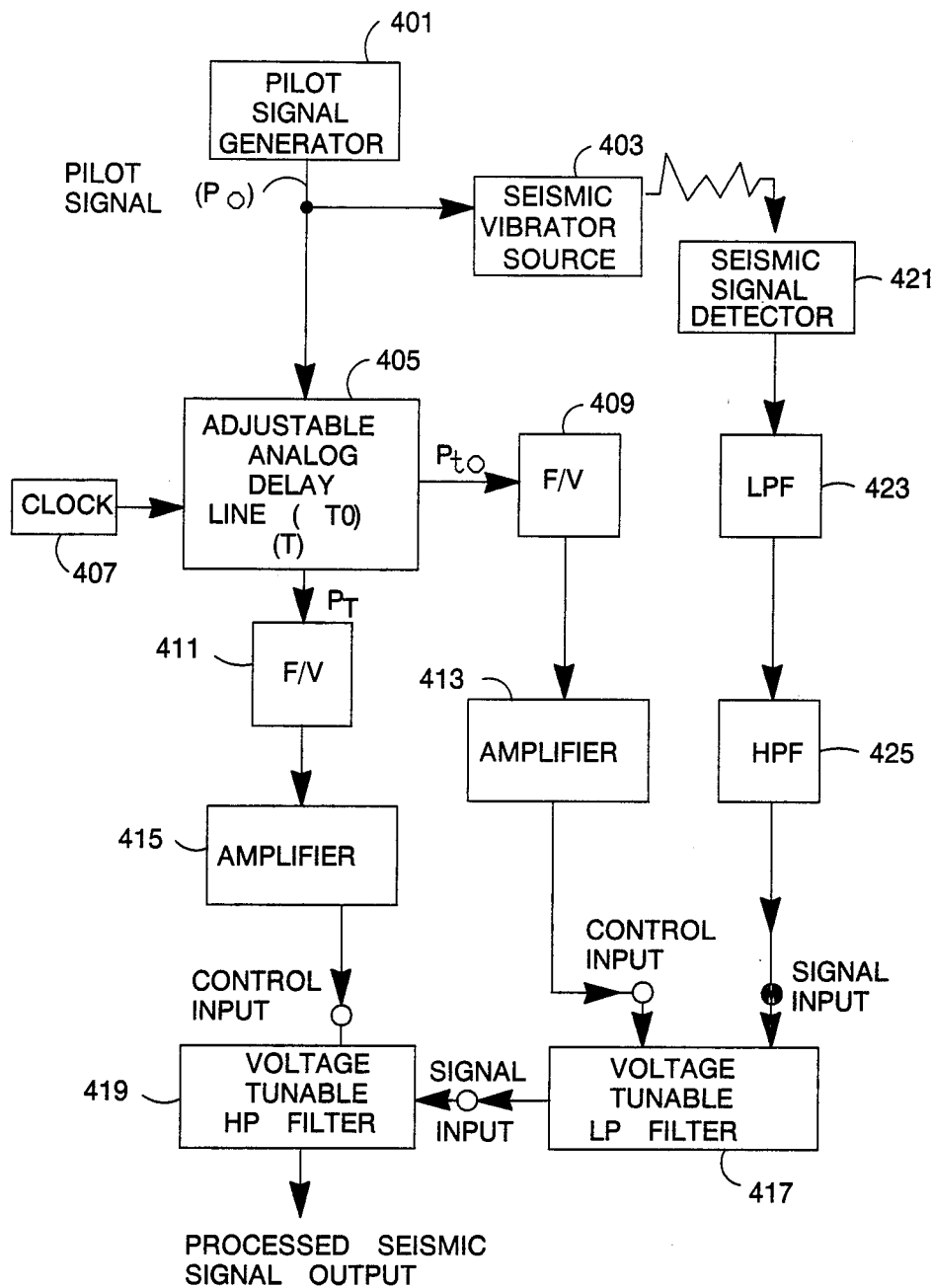
FIG. 4 shows the circuit diagram of the apparatus of the preferred embodiment of the instant invention.

The time variable filtering process described in FIGS. 2 and 3 can be accomplished by means of the system depicted in the FIG. 4. The pilot signal generator 401 can be implemented using the currently available pilot signal generator of Continental Oil Company's VIBROSEIS system or any other programmable frequency sweep generator. This sweep generator can be programmed to vary the frequency of its output signal $P_0$ according to the following equation: $f=at^2+bt+c$, where a, b, and c are programmable constants. The generated pilot signal $P_0$ is transmitted to the seismic vibrator source 403, which generates a seismic signal that is a counter part of the pilot signal $P_0$.

The pilot signal $P_0$ is also fed to the adjustable analog delay line 405, the preferred realization of which is the Model SAD 1024 manufactured by Reticon Corporation. This delay line is a dual 512 stage bucket-brigade device. The delay associated with the delay line 405 is made adjustable by means of the adjustable clock frequency generator 407, which is simply a variable frequency oscillator. The desired delays $t_o$ and T (as depicted in FIG. 2) are obtained by tapping the cascaded stages of bucket-brigade devices in the delay line 405 at the desired delay interval locations. The resulting output signals of the delay line 405 are the delayed counterparts $P_{t_o}$ and $P_T$ of the original pilot signal $P_0$. These delayed counterparts have the same frequency content and frequency time variation as the original pilot signal $P_0$, but they are delayed in time by the desired amounts $t_o$ and T. $P_{t_o}$ is then transmitted to frequency to voltage converter 409 which generates an output voltage level that is directly proportional to the frequency of the input signal $P_{t_o}$. The preferred version thereof is the Analog Devices Model 451 F/V converter which is quite versatile and relatively low in cost. The output voltage level of converter 409 is matched via amplifier 413 to control the breakpoint location of voltage tunable low pass filter 417. The preferred version of filter 417 is the Frequency Devices Model 300, which is a readily available off-the-shelf item. The model 300 is a versatile voltage tunable filter with both high pass and low pass outputs, and is tunable over a range of 10 to 200 Hertz with a tuning linearity of 1%.

In a similar manner, the delayed counterpart $P_T$ of the pilot signal $P_0$ is transmitted to frequency to voltage converter 411 (also preferably an Analog Devices Model 451), the voltage level output of which is matched via amplifier 415 to the control input of voltage tunable high-pass filter 419 (also a Frequency Devices Model 300).

The received seismic signal is detected by seismic signal detector 421 and is preferably passed through low pass filter 423 and high pass filter 425 before being operated upon by the tunable filters 417 and 419. The breakpoint of low pass filter 423 is set at the lowest pilot signal frequency $f_x$ while the breakpoint of the high pass filter 425 is set at the highest pilot signal frequency $f_y$ ($f_x$ and $f_y$ are depicted in FIG. 2). Although filters 423 and 425 are not essential to the invention, their use is preferred.

By use of the system of FIG. 4 with properly selected delay times $t_o$ and T, the passband shown in FIG. 2 can be effectively accomplished so that the processed seismic signal output of filter 419 is restricted to the desired portion of the time-frequency domain.

Figure 5:
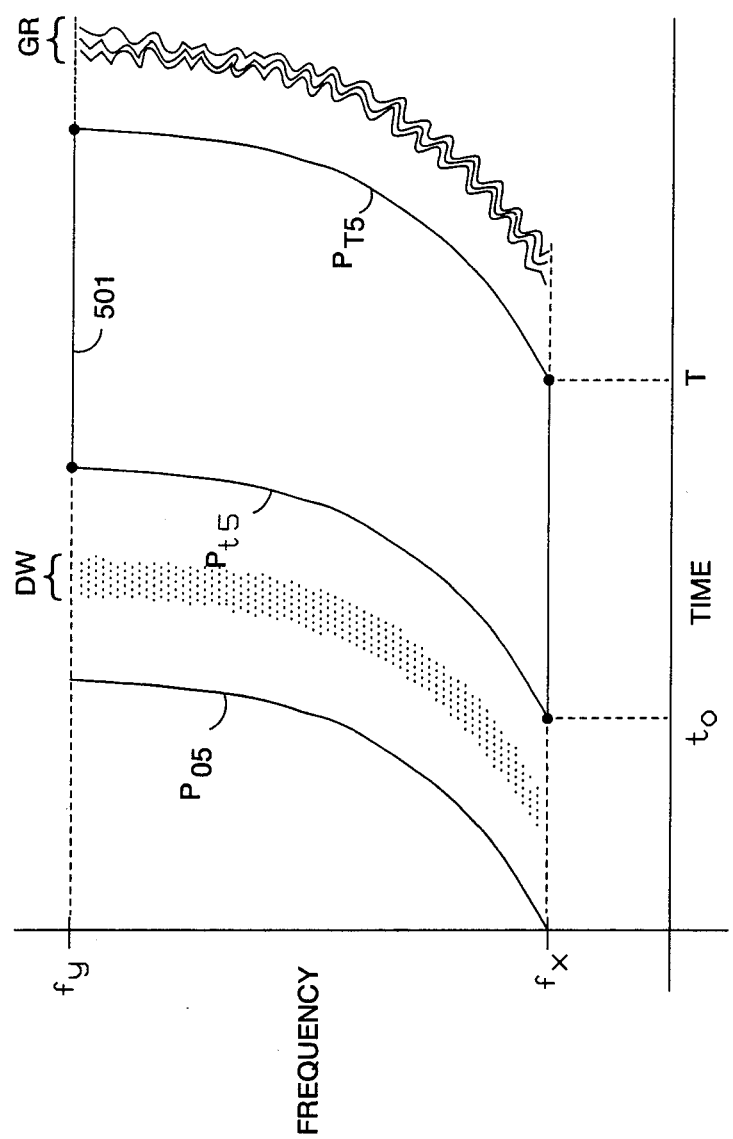
FIG. 5 depicts a typical time-frequency spectrum according to the instant invention wherein the pilot signal is a non-linear function of time.

It should be noted that the circuit of FIG. 4 is fully capable of proper operation even if the vibrator pilot signal frequency is a non-linear function of time. Thus, for example, a non-linear pilot signal such as $P_{05}$ depicted in FIG. 5 would result in a corresponding non-linear band pass region in the time-frequency domain which would contain the desired mapping data corresponding to the non-linear vibrator pilot signal $P_{05}$. Thus, as depicted in FIG. 5, the received signal acceptance region 501 need not be a parallelogram but rather may be an odd shaped region, the left and right boundaries of which are defined by delayed counterparts of the particular non-linear pilot signal.

It is to be understood that the scope of the instant invention is not restricted to the particular preferred embodiment described above, since other modes of implementing the principles of the invention may be employed; rather, the scope of the invention is defined by the appended claims.

We claim:

1. A nonheterodyne method for discriminating reflected mapping signals from direct wave and ground roll signals in seismic data procurement for mapping subterranean geological structure comprising the steps of:
   (a) generating a seismic signal with a variable frequency seismic source;
   (b) varying the frequency of said variable frequency seismic source according to a time function during the period of a seismic data procurement run;
   (c) transmitting the thus-varied seismic signal from the earth's surface to subterranean geological interfaces and producing reflected mapping signals, and also producing direct wave and ground roll signals;
   (d) receiving the reflected mapping signals and the direct wave and ground roll signals with a seismic energy sensor;
   (e) filtering the thus-received signals with a time-variable bandpass frequency filter to pass a spectrum of the received signals ' frequencies; and
   (f) varying the pass frequency spectrum of said time variable bandpass frequency filter according to a delayed counterpart of said time function during said seismic data procurement run and passing a time variable frequency output signal discriminating reflected mapping signals from direct wave and ground roll signals.

2. Method as in claim 1 further comprising:
varying the frequency spectrum location of said time-variable bandpass frequency filter and passing a frequency variable output signal defined in a time-frequency plane by a parallelogram having upper and lower sides corresponding respectively to a maximum frequency and a minimum freqency of the seismic signal and having a first side defined by a first delayed counterpart of the seismic signal having the same frequency content and frequency-time variation as the seismic signal but delayed in time by an amount corresponding to travel time of a shallowest reflected signal of interest and having a second side defined by a second delayed counterpart having the same frequency content and frequency-time variation as the seismic signal but delayed in time by an amount corresponding to travel time of a deepest reflected signal of interest.

3. A method as in claim 1 further comprising recording frequency variable output signal of said variable bandpass frequency filter having a variable pass bandwidth.

4. A method for discriminating reflected signals from direct wave and ground roll signals in seismic exploration, comprising steps of:
   (a) imparting seismic energy into the earth with a variable frequency seismic source to produce reflected signals as well as direct wave and ground roll signals;
   (b) varying the frequency of the variable frequency seismic source according to a pilot function;
   (c) receiving the reflected signals as well as the direct wave and ground roll signals with a seismic sensor;

(d) filtering the received signals to discriminate reflected signals from direct wave and ground roll signals with a low pass filter having a time delayed pass frequency varying according to the pilot function and a high pass filter having a time delayed pass frequency varying according to the pilot function.

5. The method of claim 4 wherein the pilot function f(t) varies according to:

$$f(t) = \left| \frac{fy - fx}{to} \right| t + fx$$

where,
fy=highest frequency of pilot function;
fx=lowest frequency of pilot function; and
to=time to go from fx to fy.

6. The method of claim 4 wherein the pilot function f(t) varies according to:

$$f(t) = at^2 + bt + c$$

where, a, b, and c are constants.

7. The method of claim 4 further including varying the pass frequency spectrum of the combination of the low pass and high pass filter so as to pass a frequency variable output signal defined in a time frequency plane by a parallelogram having upper and lower sides corresponding to the maximum and minimum frequency of the pilot function, and having a first side defined by a first time delayed counterpart of the pilot function having the same frequency content and frequency time variation as the pilot function but delayed in time by an amount corresponding to the travel time of the shallowest reflected signal of interest and having a second side defined by second delayed counterpart having the same frequency content and frequency time variation as the pilot function but delayed in time by an amount corresponding to the travel of time of the deepest reflected signal of interest.

8. The Method of claim 1 wherein step (f) comprises varying the pass frequency spectrum of the bandpass frequency according to FIG. 2 or FIG. 5.

9. A method for discriminating reflected mapping signals from direct wave and ground roll signals in a seismic signal comprising the steps of:
(a) generating a seismic signal with a variable frequency seismic source, wherein the frequency of the variable frequency seismic source is varied according to a control function;
(b) receiving the seismic signal with a seismic energy sensor;
(c) filtering the received seismic signal so as to pass a selected time segment of the received seismic signal; and
(d) filtering the selected time segment of the received seismic signal so as to pass a time varying frequency spectrum whereby reflected mapping signals are discriminated from direct wave and ground roll signals in the received seismic signal.

10. The method of claim 9 wherein step (d) includes varying the time frequency spectrum according to a linear control function.

11. The method of claim 9 wherein step (d) includes varying the time frequency spectrum according to a nonlinear control function.

12. The method of claim 9 wherein step (d) includes passing a frequency spectrum according to FIG. 2 or FIG. 5.

* * * * *